T. BÄUERLE.
COMBINED SPEED AND TIME INDICATOR.
APPLICATION FILED SEPT. 2, 1908.

958,074.

Patented May 17, 1910.

Witnesses.
Kenneth Romanes
Benj. Anderson

Inventor.
Tobias Bäuerle
By Paul D. Schissing
his Attorney.

UNITED STATES PATENT OFFICE.

TOBIAS BÄUERLE, OF ST. GEORGEN, GERMANY, ASSIGNOR TO THE VELOCHRONE COMPANY, OF NEW YORK, N. Y.

COMBINED SPEED AND TIME INDICATOR.

958,074. Specification of Letters Patent. Patented May 17, 1910.

Application filed September 2, 1908. Serial No. 451,453.

*To all whom it may concern:*

Be it known that I, TOBIAS BÄUERLE, a subject of the German Emperor, residing at St. Georgen, Schwarzwald, Baden, German Empire, have invented certain new and useful Improvements in Combined Speed and Time Indicators, of which the following is a specification.

The subject of my invention is a speed indicator for vehicles, which also indicates the time.

The novelty of the invention resides in the recording-lever, which strikes the drum carrying the record-sheet after certain distances have been traveled over, and which is provided with an extension or pointer which moves over a fixed scale and indicates the hours.

One form of construction of the invention is illustrated in the accompanying drawing, in which—

Figure 1:
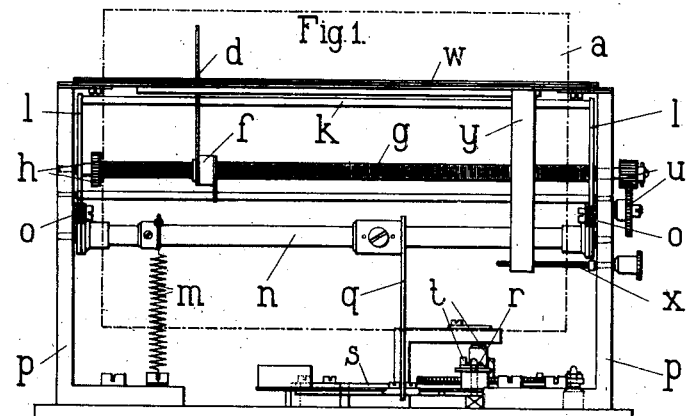
Figure 2:
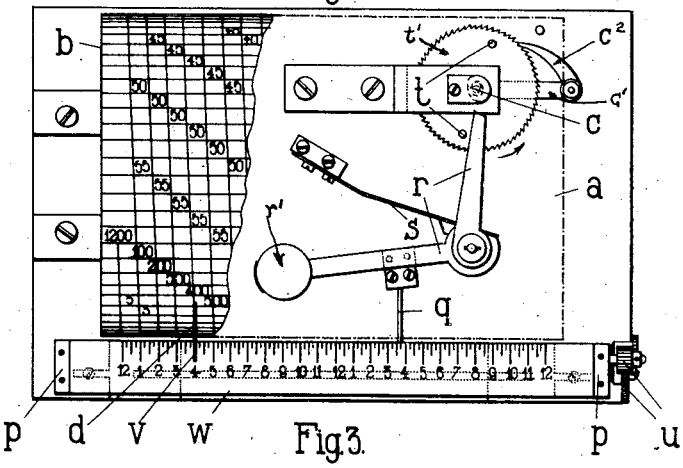
Figure 3:
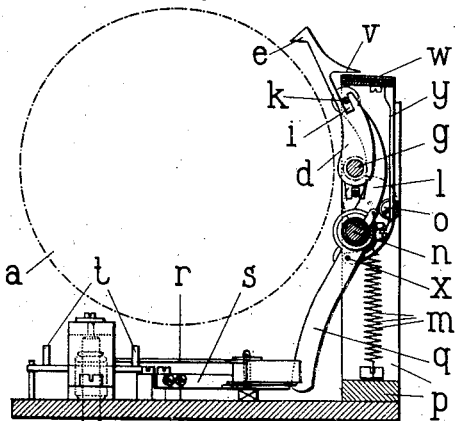

Figure 1 is a front elevation, Fig. 2 a plan, certain portions being removed to display underlying mechanism, and Fig. 3 a cross section.

The drum $a$ is driven in well-known manner by clockwork accommodated within it. Its periphery receives the tubular record-sheet $b$ (Fig. 2) marked with minute-divisions. The drum rotates 60/59 times per hour, so that the minute-indications do not come in a line, but lie stepwise and can thus be clearly printed. In this manner there results a spiral line. On this spiral line the marks indicating the speed are impressed. The speed of the vehicle is registered with the aid of a shaft $c$ by a lever $d$, whose extremity is furnished with a sharp pointer-like tooth $e$. This lever is movably secured to a nut $f$, which travels along a screw-spindle $g$, but is prevented from turning thereon. This traversing-screw $g$ is rotated with the aid of the toothed wheel $h$ by the same clockwork that drives the drum $a$. The number of rotations of the spindle $g$ and the pitch of its thread are such that during the motion of the clockwork the tooth $e$ of the lever $d$ travels uniformly along the drum on the spiral hour-line of the tubular record-sheet $b$.

To enable the lever $d$ to be actuated by the axle of the vehicle, it is slotted at $i$ (Fig. 3) to receive a round rod $k$. This latter lies parallel with the axis of the drum and is secured at the ends to arms $l$, carried by a shaft $n$, which is actuated by coiled spring $m$. When at rest the recording-device is retained in the position shown, in which the arms $l$ lie against the stops $o$, secured to the standards $p$. To the shaft $n$ there is also secured a lever $q$ inclined in downward direction and which projects into the province of a double armed lever $r$, which is held in the position shown in Fig. 2 by a spring $s$. The longer arm of the lever $r$ is loaded with a weight $r^1$, while the shorter arm protrudes into the path of pins $t$ projecting from a wheel $t^1$ loosely mounted on the shaft $c$, which latter receives its motion from one of the axles of the vehicle. The pin-wheel $t^1$ is coupled with the shaft $c$, by means of an arm $c^1$ secured to the shaft $c$ and carrying a pawl $c^2$, which engages between the ratchet teeth $t^2$ of the wheel $t^1$, so that the pins may be brought into any desired position relatively to the double armed lever $r$ at the commencement of the journey. On rotation of the pin-wheel $t^1$ in the direction of the arrow (Fig. 2), the shorter arm of the lever $r$ will be swung aside and then released. It will then snap back under the action of the spring $s$ and owing to its momentum will strike the lever $q$, so that the latter, with the shaft $n$ and the arms $l$, will rock over. The lever $d$ will also partake of this motion, being thrown forward by the rod $k$ carried by the arms $l$. The sharp, suitably shaped lever-tooth $e$ will thus strike the record-sheet $b$ of the drum and will penetrate it, the short slit thus made giving a sharp and distinct record. The motion of the lever $d$ is thus a positive one and the arms $l$, with the shaft $n$, are brought back into the initial position by the coiled spring $m$. The tooth $e$ will thus also immediately retire into the position of rest after having perforated the record-sheet. The drum $a$ will thus be in no wise obstructed in its rotation during the marking of the record. The driver of the vehicle can ascertain the speed of the latter from observation of the number of perforations thus made between the various minute-lines. The traversing-screw $g$ is rotated by the clockwork with the aid of the wheel $h$ by friction. The spindle $g$ can thus be turned for the purpose of returning the lever $d$ and setting it precisely relatively to the record-sheet $b$; this is done by means of the gearing $u$ actuated by a key. Since in its position of rest the strike-tooth $e$ is but slightly removed from the paper-drum, it also serves to indicate the time. In addition to the tooth e there is a pointer v furnished on the lever d, which travels along a fixed rule w marked with a less fine scale from which the hours can be read off. The position of the parts shown corresponds with the position of the recording and indicating lever d at 4 o'clock in the forenoon. The scale w slides on the slotted plates at the top of the standards p and is guided by screws. The scale slides in the axial direction of the drum and is moved by turning a screw x mounted in the one standard p and engaging a tapped arm y extending from the scale w. In this manner the scale can be exactly adjusted relatively to the hour-pointer v. This is necessary in view of the fact that the printed network of lines on the record sheets b does not always precisely coincide in position.

When the device is to be employed the recording and indicating lever d must first be set, by turning the traversing-screw g, to the minute-mark corresponding with the hour. By turning the screw x the scale w can, if necessary, then be brought exactly opposite the hour-hand v of this lever, whereupon the device is ready for use.

Having thus described my invention, I claim as new—

1. A speed and time indicator, comprising a framing, a rotating record-sheet carrying drum mounted thereon, a rotating traversing-screw mounted on the framing parallel with the drum, a nut traversed by said screw, a swing-arm carried by the nut and presenting a perforating and minute indicating head and an hour pointer, a stationary scale over which the hour pointer moves, a shaft driven by the body whose speed is to be indicated, and spring-controlled means, actuated by said shaft, intermittently depressing the perforator-head upon the record-sheet carrying drum and then retracting it therefrom, substantially as described.

2. A speed and time indicator, comprising a framing, a rotating record-sheet carrying drum mounted thereon, a rotating traversing-screw mounted on the framing parallel with the drum, a nut traversed by said screw, a swing-arm carried by the nut and presenting a perforating and minute indicating head and an hour pointer, a stationary adjustable scale over which the hour pointer moves, a shaft driven by the body whose speed is to be indicated, a rocking spring-actuated frame mounted on the framing and engaging said swing-arm, spring-actuated lever-mechanism rocking forward said frame and thus depressing the perforator-head upon the record-sheet carrying drum, and means actuated by said shaft for intermittently operating said lever-mechanism, substantially as described.

In testimony whereof I affix my signature in presence of two witnesses.

TOBIAS BÄUERLE.

Witnesses:
 CARL W. SCHMITT,
 SYDNEY ELLIOTT.